Nov. 14, 1967

P. M. PENET 3,352,155

VALVE AND FLOWMETER ASSEMBLY

Filed Sept. 29, 1965

Pierre Marie Penet
INVENTOR.

BY Michael P. Breston

ATTORNEY

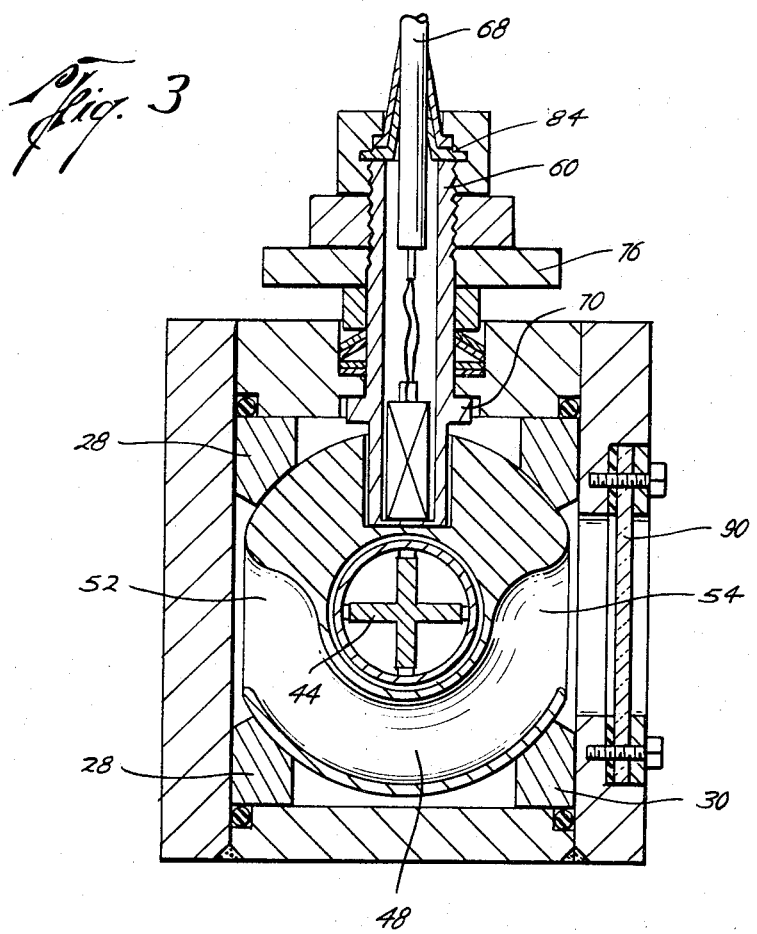

United States Patent Office 3,352,155
Patented Nov. 14, 1967

3,352,155
VALVE AND FLOWMETER ASSEMBLY
Pierre Marie Penet, Creteil, France, assignor to Societe d'Instrumentation Schlumberger, Paris, France, a corporation of France
Filed Sept. 29, 1965, Ser. No. 491,227
Claims priority, application France, Sept. 28, 1964, 989,899
2 Claims. (Cl. 73—198)

ABSTRACT OF THE DISCLOSURE

A combination fluid valve and flowmeter assembly is described which includes a housing having a fluid ingress and fluid egress ports that may be selectively fluid coupled by turning a valve mounted for rotation in the housing. The valve includes two fluid passages disposed at a sufficient angle with respect to one another so that fluid flow between the fluid ingress and egress ports is limited to one of the passages. A hollow shaft extends through the housing and has one end thereof connected to the valve to effect valve turning. A bladed flowmeter is mounted in the first passage of the valve and rotates in response to fluid flow through that passage. The flowmeter mounts a magnet from which magnetic flux emanates and a magnetic flux detector is mounted in said one end of the shaft for detecting the flux received from the flowmeter. The detector provides a signal indication of the rate of flow through the first passage.

---

This invention relates to hydraulic switches and more particularly to hydraulic switches especially adapted for selectively inserting a flowmeter into a pipeline.

In many applications, as in pipelines carrying heavy fuels, it is necessary to periodically clean the lines with steam. It is also necessary and in fact indispensable that the flowmeters be removed before the strong currents of steam are employed. On the other hand, flowmeters quite frequently become clogged. It is then necessary to remove the flowmeters without interrupting for too long a time the fluid flow in the main pipeline. In practice, it is customary to couple to the flowmeter an auxiliary pipe which acts as a diversion pipe. This diversion pipe is usually equipped with a shut off valve. Two other shut off valves are also mounted up stream and down stream of the flowmeter. When one wishes to clean the main pipe with steam, the shut off valve mounted in the diversion pipe is opened and one of the shut off valves placed in phase with the flowmeter unit is closed. Similarly, when it is required that the flowmeter assume, by thermo conductivity, the temperature of the fluid, the flow rate of which is being measured, the two shut off valves in phase with the flowmeter are closed and the shut off valve in the diversion pipe is opened. However when it is desired to dismantle the flowmeter, it is well-known that it is necessary to isolate the meter first; this is done by closing the two shut off valves.

A hydraulic switch for a flowmeter usually, therefore, comprises three shut off valves and a section of a diversion pipe. This assembly is bulky, slow to put into action, and relatively expensive.

It is therefore an object of this invention to provide a new and improved hydraulic switch which can be easily and rapidly put into operation and which can be built at a fraction of the cost of devices accomplishing similar functions.

In accordance with one object of this invention the new and improved hydraulic switch comprises a valve having a first port and a second port, a rotatably mounted member inside the valve, the member defining between the ports a main passage in one of its rest positions (the "in circuit position"), and a flowmeter removably positioned in the main passage.

By virtue of this arrangement the connecting and disconnecting of the flowmeter can be easily accomplished.

In accordance with another object of this invention, the rotatably mounted member establishes an auxiliary passage between the two ports when it is desired to place the flowmeter "out of circuit."

By virtue of this arrangement there is no interruption of the flow of fluid when the flowmeter is placed out of circuit.

According to a further object of this invention the valve is provided with an inspection window which is in alignment with the main passage when the valve is placed out of circuit. This arrangement allows the easy removal of the flowmeter unit.

The above and other objects and advantages of this invention will become more apparent from the description which follows when taken in connection with the attached drawings in which:

FIGURE 3 is a cross-section taken on line 3—3 in FIG. 1.

Figure 1:
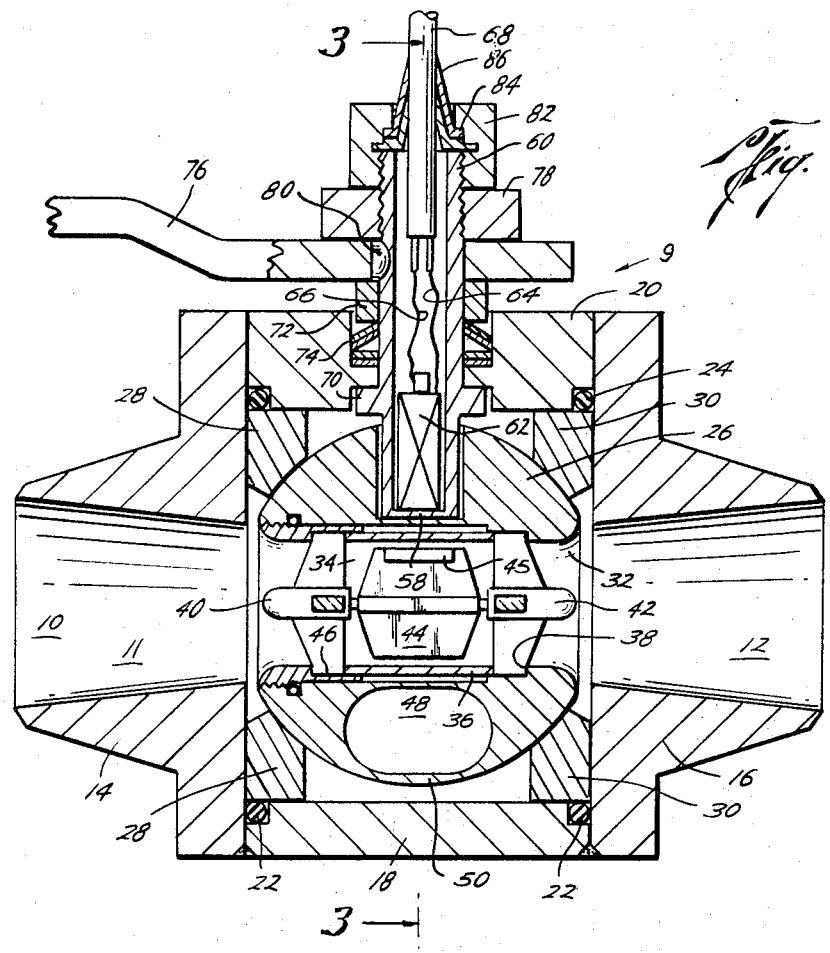
FIGURE 1 is a view in cross-section of the hydraulic switch in accordance with this invention.
Figure 2:
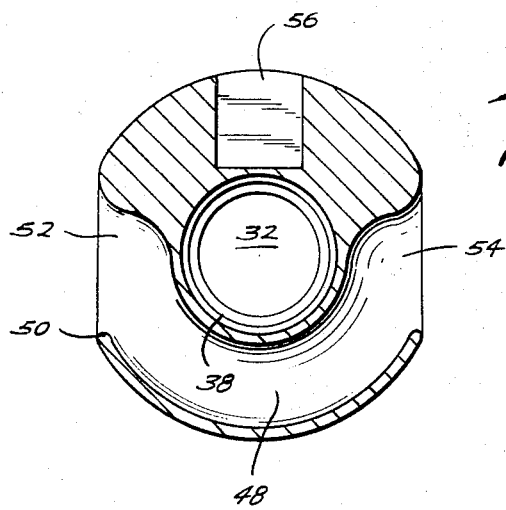
FIGURE 2 is a view in cross-section of the rotatable member in the hydraulic switch of FIG. 1.

Referring to the figures, 10 and 12 are the ports of a hydraulic switch generally designated as 9 having a valve 11 of which 14 and 16 constitute the securing collars, 18 and 20 the base and the cap, and 22 and 24 the outer fluid-tight joints. The valve 11 has a spherical member 26 of non-magnetic material supported by two interior fluid-tight joints 28 and 30. The spherical member 26 is apertured by a central main passage 32 in which is placed a flowmeter generally designated as 34. The meter 34 employs magnetic sensing and comprises a sleeve support 36 abutting a shoulder 38 produced at one end of the main passage 32. Cross bars 40 and 42 respectively fixed at each end of the sleeve 36 pivotally support a conventional turbine 44 equipped with a flux emanating magnet 45. The sleeve 36 is secured in the main passage 32 by a threaded collar 46. The spherical member 26 is manufactured in a manner such that an auxiliary passage 48 is defined having an outer wall 50. The ports 52 and 54 of the passage 48 are disposed along a line substantially perpendicular to the central main passage 32.

In the spherical member 26 there is provided an opening 56 having a substantially square cross-section for receiving the square head 58 of a control shaft 60. The shaft 60 is hollow and contains near its head 58 a detecting coil 62. The output leads 64 and 66 of the coil 62 are connected to two conductors of a connection cable 68. The control shaft 60 is provided with a collar 70 which is supported on the cap 20 of the valve 11. On the exterior of the valve 11 is provided a ring 72 which cooperates with a washer 74 to maintain under stress the control handle 76 on a securing nut 78. A key 80 insures the engagement between the handle 76 and the control shaft 60. A counter nut 82 blocks the nut 78 and maintains the fluid-tight conical joint 84 and its tightening joint 86. In the side member of the valve there is provided an inspection window 90 having a diameter greater than that of the collar 46.

In operation, when the control handle 76 places the spherical member in the in-circuit position the main passage 32 establishes communication between the ports 10 and 12 of the valve 11. The flow of fluid causes the turbine 44 to rotate thereby inducing electrical signals in the coils 62. The electrical signals are transmitted by the cable 68. From these electrical signals the rate of flow can be determined as known to those skilled in the art.

By rotating the handle 76 approximately 90°, the spherical member 26 is placed in its out-of-circiut position and the auxiliary passage 48 provides fluid communication between the ports 10 and 12. It will be appreciated that in the out-of-circuit position it is possible to remove the flowmeter through the inspection window 90, the fluid tightness of the valve being assured by the joints 28 and 30. In order to avoid hydraulic hammering the continuity of fluid flow is obtained by virtue of a suitable widening of the ports 52 and 54 of the passage 48 and by virtue of selecting a relatively large internal diameter for the fluid-tight joints 28 and 30.

The invention is not limited to the preferred embodiment above described but is subject to many variations. Thus for example the member 26 instead of being spherical could be cylindrical or conical. Other modifications will readily suggest themselves to those skilled in the art.

What is claimed is:

1. A combination valve and flowmeter assembly comprising: a housing having at least one fluid ingress and at least one fluid egress port, a valve mounted for angularly displacement in said housing and including first and second fluid passages disposed at a sufficient angle with respect to one another that fluid flow between the fluid ingress and egress ports is restricted to one of said passages, a hollow shaft having an end thereof extending through said housing and connecting to said valve, said shaft being rotatable to effect angular displacement of said valve until one of said fluid passages allows fluid flow between said ingress and egress ports, a bladed flowmeter mounted in the first passage of said valve for rotation in response to fluid flow through said first passage, means mounted on said flowmeter for producing magnetic flux, and a magnetic flux detector mounted in said end of said shaft for detecting the flux received from said flowmeter and providing a signal indication as to the rate of flow of fluid through said first passage.

2. The combination as claimed in claim 1, wherein said housing is apertured to provide a window that is aligned with said first passage when said valve is displaced until said second passage allows fluid flow between said ports, the window being of sufficient size to permit the withdrawal of said flowmeter from said housing.

References Cited

UNITED STATES PATENTS

| | | | |
|---|---|---|---|
| 2,585,290 | 2/1952 | Walker | 73—211 |
| 2,764,891 | 10/1956 | McGowen | 73—211 |
| 3,244,002 | 4/1966 | Prono et al. | 73—231 |

FOREIGN PATENTS

| | | |
|---|---|---|
| 1,332,419 | 6/1963 | France. |

RICHARD C. QUEISSER, *Primary Examiner.*

JAMES J. GILL, *Examiner.*

E. D. GILHOOLY, *Assistant Examiner.*